US010552592B2

(12) United States Patent
Hwang et al.

(10) Patent No.: US 10,552,592 B2
(45) Date of Patent: Feb. 4, 2020

(54) MULTI-MODAL FUSION METHOD FOR USER AUTHENTICATION AND USER AUTHENTICATION METHOD

(71) Applicant: Samsung Electronics Co., Ltd., Suwon-si, Gyeonggi-do (KR)

(72) Inventors: Wonjun Hwang, Seoul (KR); Wonjun Kim, Hwaseong-si (KR); Sungjoo Suh, Seoul (KR); Byungin Yoo, Seoul (KR); Changkyu Choi, Seongnam-si (KR); Jaejoon Han, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 665 days.

(21) Appl. No.: 15/097,555

(22) Filed: Apr. 13, 2016

(65) Prior Publication Data

US 2017/0039357 A1    Feb. 9, 2017

(30) Foreign Application Priority Data

Aug. 3, 2015 (KR) ......................... 10-2015-0109712

(51) Int. Cl.
| | |
|---|---|
| G06F 21/32 | (2013.01) |
| G06F 21/36 | (2013.01) |
| H04L 9/32 | (2006.01) |
| H04L 9/08 | (2006.01) |
| H04L 29/06 | (2006.01) |

(52) U.S. Cl.
CPC ............ *G06F 21/32* (2013.01); *G06F 21/36* (2013.01); *H04L 9/0866* (2013.01); *H04L 9/3231* (2013.01); *H04L 63/0861* (2013.01)

(58) Field of Classification Search
CPC ..... G06F 21/32; G06F 21/36; H04L 63/0861; H04L 9/0866; H04L 9/3231
See application file for complete search history.

(56) References Cited

U.S. PATENT DOCUMENTS

| | | | |
|---|---|---|---|
| 6,591,224 B1 | 7/2003 | Sullivan et al. | |
| 7,835,541 B2 | 11/2010 | Lee et al. | |
| 2002/0030359 A1* | 3/2002 | Bergenek ............... | G06F 21/32 283/68 |
| 2006/0171571 A1 | 8/2006 | Chan et al. | |
| 2007/0160262 A1 | 7/2007 | Kim et al. | |
| 2007/0172099 A1 | 7/2007 | Park et al. | |
| 2009/0037978 A1* | 2/2009 | Luque ..................... | G06F 21/32 726/2 |

(Continued)

*Primary Examiner* — Joseph P Hirl
*Assistant Examiner* — Thomas A Gyorfi
(74) *Attorney, Agent, or Firm* — Harness, Dickey & Pierce, P.L.C.

(57) ABSTRACT

A user authentication method includes receiving a first input image including information on a first modality; receiving a second input image including information on a second modality; determining at least one first score by processing the first input image based on at least one first classifier, the at least one first classifier being based on the first modality; determining at least one second score by processing the second input image based on at least one second classifier, the at least one second classifier being based on the second modality; and authenticating a user based on the at least one first score, the at least one second score, a first fusion parameter of the at least one first classifier, and a second fusion parameter of the at least one second classifier.

17 Claims, 8 Drawing Sheets

(56) References Cited

U.S. PATENT DOCUMENTS

| | | |
|---|---|---|
| 2010/0228692 A1 | 9/2010 | Guralnik et al. |
| 2011/0135165 A1 | 6/2011 | Wechsler et al. |
| 2012/0300980 A1 | 11/2012 | Yokono |
| 2013/0227678 A1 | 8/2013 | Kang et al. |
| 2014/0010450 A1 | 1/2014 | Suwa et al. |
| 2014/0333415 A1* | 11/2014 | Kursun .................. G06F 21/32 340/5.83 |
| 2015/0092997 A1 | 4/2015 | Yamaguchi |
| 2015/0220716 A1* | 8/2015 | Aronowitz .............. G06F 21/32 706/12 |
| 2016/0162673 A1* | 6/2016 | Kutliroff ................. G06F 21/32 382/115 |

* cited by examiner

FIG. 7

MULTI-MODAL FUSION METHOD FOR USER AUTHENTICATION AND USER AUTHENTICATION METHOD

CROSS-REFERENCE TO RELATED APPLICATION

This application claims under 35 U.S.C. § 119 to Korean Patent Application No. 10-2015-0109712, filed on Aug. 3, 2015, in the Korean Intellectual Property Office, the disclosure of which is incorporated herein by reference in its entirety.

BACKGROUND

1. Field

At least one example embodiment relate to a multi-modal method for user authentication and a user authentication method.

2. Description of the Related Art

Significance of security authentication is increasing with the development of various mobile devices or wearable devices for example, smart phones. Authentication technology by biometric recognition authenticates a user using a fingerprint, an iris, a voice, a face, and blood vessels, since such biometric features used for authentication vary from person to person, do not cause any inconvenience of carrying with, have a minimal or reduced risk of being stolen or imitated, and do not change during a lifetime.

For the authentication technology by biometric recognition, a non-contact type recognition method, for example, face recognition and iris recognition, may be used in addition to a contact type recognition method, for example, fingerprint recognition. When the non-contact type recognition method is used, a user may freely move a hand using a mobile phone. In an example, an infrared ray (IR) camera is used for the iris recognition, and an eye area may be detected in an IR image. In addition, a camera for self photographing is used for the face recognition in lieu of requiring an additional device.

SUMMARY

Some example embodiments relate to a user authentication method.

In some example embodiment, the method may include receiving a first input image including information on a first modality, receiving a second input image including information on a second modality, determining at least one first score by processing the first input image based on at least one first classifier, the at least one first classifier being based on the first modality, determining at least one second score by processing the second input image based on at least one second classifier, the at least one second classifier being based on the second modality, and authenticating a user based on the at least one first score, the at least one second score, a first fusion parameter of the at least one first classifier, and a second fusion parameter of the at least one second classifier.

The determining of the at least one first score may include extracting a predetermined subarea from the first input image, and determining a score of the subarea using a classifier corresponding to the extracted subarea among the at least one first classifier.

The determining of the at least one second score may include dividing the second input image into a plurality of blocks, determining matching scores between the blocks and enrolled images, and selecting predetermined best scores among the matching scores.

Each of the first modality and the second modality may include at least one of a face of the user, a fingerprint of the user, an iris of the user, and a vein of the user, and the first modality may differ from the second modality.

The first fusion parameter and the second fusion parameter may be determined in advance based on a boosting scheme. The boosting scheme may select a classifier having an optimal performance among candidate classifiers based on a boosting parameter training data, update the boosting parameter based on an output of the selected classifier, and determine at least one of the first fusion parameter and the second fusion parameter by determining a fusion parameter of the selected classifier based on the updated boosting parameter.

The authenticating of the user may include performing weighted summing of the first score and the second score based on the first fusion parameter and the second fusion parameter, and authenticating the user by comparing a result of the weighted summing to a predetermined threshold.

The at least one first classifier may be determined to correspond to at least one predetermined subarea in the first input image. The at least one second classifier may be determined based on a result of arranging matching scores between enrolled images and blocks to divide the second input image.

Other example embodiments relate to a multi-modal fusion method.

In some example embodiments, the method may include determining fusion parameters of candidate classifiers by iteratively selecting any one of the candidate classifiers including at least one first classifier configured to authenticate a user based on a first modality and at least one second classifier configured to authenticate the user based on a second modality. The fusion parameters may include weights of the candidate classifiers.

The determining of the fusion parameters of the candidate classifiers may include selecting a classifier having an optimal performance among the candidate classifiers based on a boosting parameter of training data, updating the boosting parameter based on an output of the selected classifier, and determining a fusion parameter of the selected classifier based on the updated boosting parameter. The boosting parameter may be determined in a previous iteration The selecting of the classifier may include selecting a classifier having an optimal performance index determined based on the boosting parameter and a result of classifying the training data.

The updating of the boosting parameter may include decreasing a value of the boosting parameter of the training data of which a recognition result of the selected classifier is true, and increasing the value of the boosting parameter of the training data of which the recognition result of the selected classifier is false.

The multi-modal fusion method may further include at least one of determining a final parameter set based on the fusion parameters determined to correspond to each of the candidate classifiers when the determining of the fusion parameters is iteratively performed by a predetermined number, and determining a final parameter set based on the fusion parameters determined to correspond to each of the candidate classifiers when a recognition rate determined in the determining of the fusion parameters is greater than or equal to a predetermined threshold.

The at least one first classifier may be determined to correspond to at least one predetermined subarea in an input image. The at least one second classifier may be determined based on a result of arranging matching scores between enrolled biometric information and blocks to divide input biometric information.

Additional aspects of example embodiments will be set forth in part in the description which follows and, in part, will be apparent from the description, or may be learned by practice of the disclosure.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein, to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the sin forms "a", "an" and the are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and in a two-dimensional pattern.

Examples may be implemented as various types of products, for example, personal computers, laptop computers, tablet computers, smart phones, televisions, smart home appliances, intelligent vehicles, kiosks, and wearable devices. For example, the examples may be applied to pre-processing of an image to authenticate a user using a smart phone, a mobile device, and a smart home system. In the same manner, the examples may be applied to an intelligent vehicle system, and a payment service through user authentication. Hereinafter, reference will now be made in detail to examples with reference to the accompanying drawings, wherein like reference numerals refer to like elements throughout.

A multi-modal fusion apparatus, hereinafter, referred to as a "fusion apparatus", may determine fusion parameters corresponding to a plurality of modalities to authenticate a user based on a plurality of modalities. The fusion apparatus may be provided in a software module, a hardware module, or various combinations thereof. For example, the fusion apparatus may be implemented based on various methods such as a single processor-based system, a special purpose hardware-based system, a system in which a processor and a hardware accelerator (HWA) are combined, and a cloud computing system. For example, according to at least one example embodiment, the fusion apparatus may include or be implemented by one or more circuits or circuitry (e.g., hardware) specifically structured to carry out some or all of the operations described herein as being performed by a fusion apparatus (or an element thereof). According to at least one example embodiment, the fusion apparatus may include or be implemented by a memory and one or more processors executing computer-readable code (e.g., software) that is stored in the memory and includes instructions corresponding to some or all of the operations described herein as being performed by a fusion apparatus (or an element thereof). According to at least one example embodiment, the fusion apparatus may be implemented by, for example, a combination of the above-referenced hardware and processors executing computer-readable code. The term 'processor,' as used in the present disclosure, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multi-processor, an application-specific integrated circuit (ASIC), and a field programmable gate array (FPGA). Processors executing program code are programmed processors, and thus, are special-purpose computers.

A modality refers to an aspect in which a unique feature of a user is present. For example, the modality includes a face of the user, a fingerprint of the user, an iris of the user, and a vein of the user. As will be described later, the fusion apparatus may determine a fusion parameter for fusing different modalities for a user authentication. Hereinafter, a method of determining a fusion parameter to authenticate a user based on a combination of a face and a fingerprint of a user, and a method of authenticating a user based on a fusion parameter will be described with reference to the accompanying drawings. For ease of description, it is assumed that a face of a user is used as a first modality and a fingerprint of the user is used as a second modality. However, examples are extended to use a combination of various modalities. For example, i) a face of a user and an iris of the user may be used, ii) a fingerprint of a user and a vein of the user may be used, or iii) at least three different modalities may be used. Further, according to at least some example embodiments, a fusion parameter is a parameter used in a fusion process/operation. In more detail, when multi-model fusion based on a face and a fingerprint is performed by way of weight summation, the value of Weight is the "fusion parameter."

Figure 1:
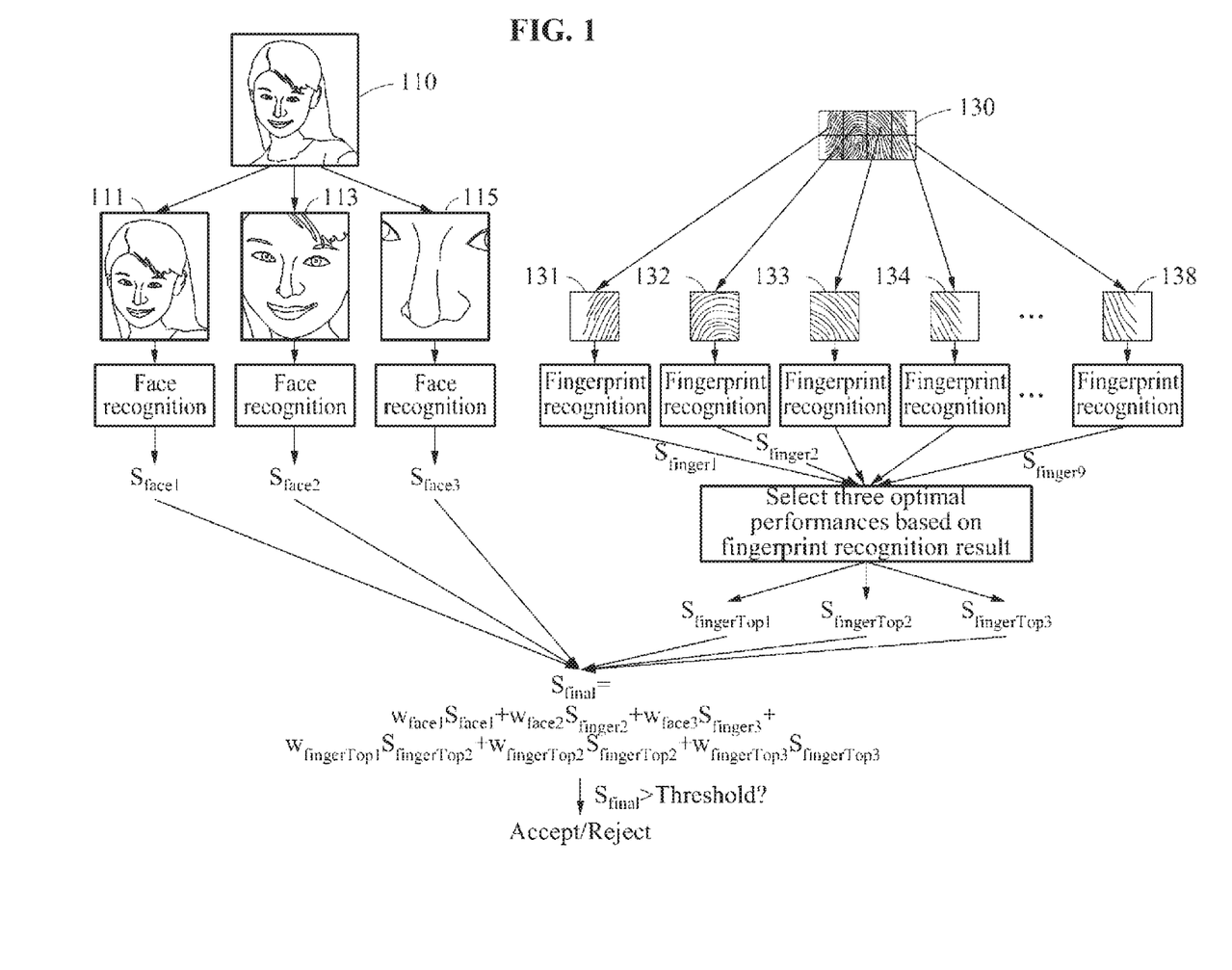
FIG. 1 illustrates an example of authenticating a user based on a multi-modal fusion method according to at least one example embodiment.

FIG. 1 illustrates an example of authenticating a user based on a multi-modal fusion method according to at least one example embodiment. Referring to FIG. 1, a face image 110 and a fingerprint image 130 input for a user authentication are illustrated.

A fusion apparatus extracts a feature of at least one predetermined or, alternatively, desired subarea in the face image 110 from the input face image 110. The subarea may be a predetermined or, alternatively, desired area in a face of a user, for example, a face, a contour of the face, a nose, and an eye. Subareas may overlap.

The fusion apparatus may calculate a score indicating a similarity between a subarea and enrolled images by comparing pre-enrolled images to subareas extracted from the face image 110.

The fusion apparatus may calculate scores by comparing subareas extracted from the enrolled images of a face to the subareas extracted from the face image 110. The enrolled images of the face may be enrolled in advance, and subareas of the enrolled images may be extracted based on an identical method of extracting the subareas of the face image 110. For example, the fusion apparatus may use, as a score, a normalized correlation value between the subareas of the enrolled images and the subareas of the face image 110, or use, as a score, a similarity based on a size of an overlap area between the subareas of the enrolled images and the subareas of the face image 110. In an example, three subareas 111, 113, and 115 for the face recognition are used, a number of subareas to be extracted for the face recognition is not limited thereto.

The fusion apparatus determines scores Sface1, Sface2, and Sface3 by comparing the subareas of the enrolled images to the subareas 111, 113, and 115 extracted from the face image 110. For example, each of the scores Sface1, Sface2, and Sface3 may be determined by different face classifiers corresponding to the subareas 111, 113, and 115, respectively.

The fingerprint image 130 may be a portion image corresponding to a portion of an entire fingerprint of the user. The fusion apparatus extracts block images 131, 132, 133, 134, . . . , and 138 by dividing the input fingerprint image 130 into a plurality of blocks. The block images 131, 132, 133, 134, . . . , and 138 may be overlapped, or not be overlapped.

The fusion apparatus may calculate scores Sfinger 1, Sfinger 2, . . . , and Stinger n by comparing the enrolled images of the fingerprint to the block images 131, 132, 133, 134, . . . , and 138 extracted from the fingerprint image 130. Such as the fingerprint image 130, the enrolled images of the fingerprint may be portion images corresponding to a portion of the entire fingerprint.

In an example, when a number of block images is B, for example, a natural number greater than 1, and a number of enrolled image is E, for example, a natural number greater than 1, the fusion apparatus may calculate a score by comparing each of the enrolled images to each of the block images. Concisely, the fusion apparatus may perform comparing and image registration B×E times.

For example, the fusion apparatus may calculate scores Sfinger 1, Sfinger 2, . . . , and Sfinger 9 based on block pattern image registration between the enrolled images of the fingerprint and the block images 131, 132, 133, 134 . . . , and 138. For example, scores may be determined by a fingerprint classifier to perform comparing and image registration of block images and enrolled images.

The fusion apparatus may select scores SfingerTop 1, SfingerTop 2, and SfingerTop 3 in a predetermined or, alternatively, desired number, for example, three, and the scores SfingerTop 1, SfingerTop 2, and SfingerTop 3 have highest values among the scores Sfinger 1, Sfinger 2, . . . , and Sfinger 9 calculated based on the block pattern image registration.

In general, since fingerprint recognition has a relatively small overlap area between a distribution of positive samples and a distribution of negative samples compared to the face recognition, a recognition result may be clearly classified to be true or false. In an example, such a feature of a modality is used for calculating a final score by selecting highest scores with respect to the fingerprint recognition.

In such an example, fusion authentication or multi-authentication may be performed by multi-modal fusion based on a feature of each modality. The feature of each modality will be described with reference to FIG. 5. Also, a fusion authentication result of a face and a fingerprint will be described with reference to FIG. 6.

The fusion apparatus may calculate a final score Sfinal, for example, a final image registration result, by performing weighted summing of the scores Sface1, Sface2, and Sface3 associated with the face recognition and the scores Sfinger-Top 1, SfingerTop 2, and SfingerTop 3 selected associated with the fingerprint recognition. The scores Sface1, Sface2, and Sface3 associated with the face recognition and weights wface1, wface2, wface3, wfingerTop 1, wfingerTop 2, and wfingerTop 3 corresponding to each of the scores Sfinger-Top 1, SfingerTop 2, and SfingerTop 3 selected associated with the fingerprint recognition may be learned in advance. A method of learning weights will be described below in detail.

The fusion apparatus may accept or reject user authentication in response to a result of comparing the final score Sfinal, for example, the final registration result, to a predetermined or, alternatively, desired threshold. Security levels may differ based on a type of an application to perform the user authentication. The threshold may be determined in advance based on a security level required based on a type of an application. The security level may be expressed by various metrics, for example, a false acceptance rate (FAR) and a false rejection rate (FRR).

Figure 2:
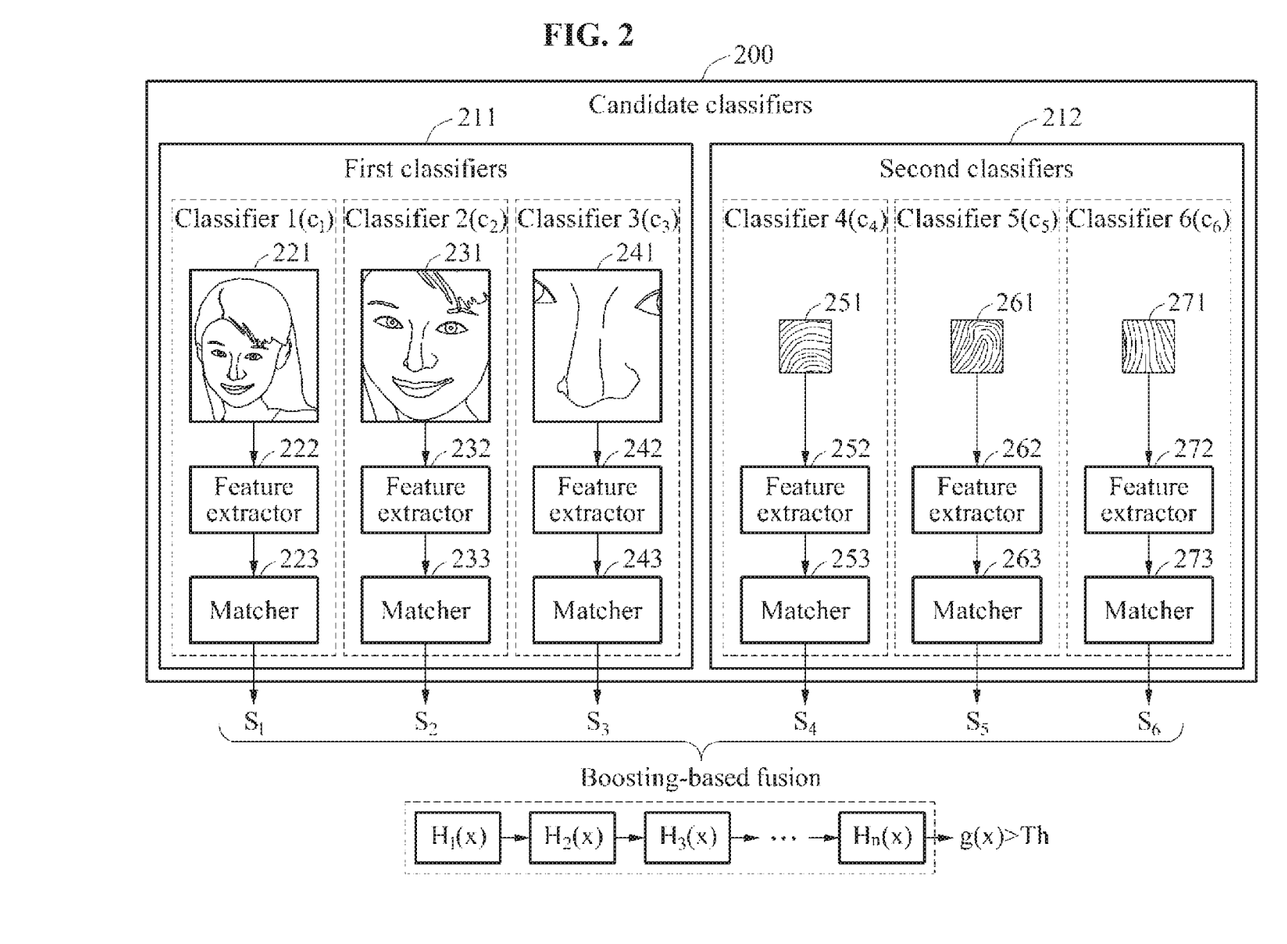
FIG. 2 illustrates an example of a configuration of a multi-modal fusion apparatus according to at least one example embodiment.

FIG. 2 illustrates an example of a configuration of a multi-modal fusion apparatus according to at least one example embodiment. Referring to FIG. 2, a fusion apparatus may allow fusion parameters to be learned. Here, the fusion parameters may be used for fusing a plurality of candidate classifiers 200.

The plurality of candidate classifiers 200 includes at least one first classifier 211 and at least one second classifier 212. The at least one first classifier 211 authenticates a user based on a first modality. For example, the first modality may be a face of a user. As described above, the at least one first classifier 211 is determined to correspond to at least one predetermined or, alternatively, desired subarea in an input image.

The at least one first classifier 211 includes, for example, a classifier 1 (c1), a classifier 2 (c2), and a classifier 3 (c3) for face recognition. The classifier 1 (c1) recognizes an entire face contour area, the classifier 2 (c2) recognizes an area including a nose, eyes, and lips of the user, and the classifier 3 (c3) recognizes an area including the nose of the user.

The classifier 1 (c1), the classifier 2 (c2), and the classifier 3 (c3) may receive subareas extracted from the input image based on the first modality. For example, the classifier 1 (c1) receives a subarea 221, the classifier 2 (c2) receives a subarea 231, and the classifier 3 (c3) receives a subarea 241. In an example, the classifier 1 (c1), the classifier 2 (c2), and the classifier 3 (c3) may receive the input image based on the first modality and directly extract the subareas from the received input image.

The classifier 1 (c1) includes a feature extractor 222 and a matcher 223. The feature extractor 222 extracts a feature vector from the subarea 221. For example, the feature extractor 222 may extract the feature vector from the subarea 221 based on a convolutional neural network (CNN). The feature vector includes a plurality of features. The matcher 223 may match the feature vector extracted by the feature extractor 222 to a feature vector of a pre-enrolled face enrolled image. For example, the matcher 223 may calculate a score S1 indicating a similarity between a subarea of the enrolled image and a subarea of the input image based on a Euclidean distance between the subarea of the enrolled image and the subarea of the input image. The classifier 2 (c2) and the classifier 3 (c3) may calculate a score S2 and a score S3 based on a similar method used by the classifier 1 (c1).

The at least one second classifier 212 authenticates the user based on a second modality. For example, the second modality may be a fingerprint of the user. The at least one second classifier 212 is determined based on a result of arranging image matching scores, hereinafter, referred to as matching scores, between enrolled biometric information and blocks to divide input biometric information. For example, the at least one second classifier 212 refers to the classifiers selected in FIG. 1.

The at least one second classifier 212 includes, for example, a classifier 4 (c4), a classifier 5 (c5), and a classifier 6 (c6). The classifier 4 (c4), the classifier 5 (c5), and the classifier 6 (c6) may receive divided blocks from the input image based on the second modality. For example, from a fingerprint image, the classifier 4 (c4) receives a divided block 251, the classifier 5 (c5) receives a divided block 261, and the classifier 6 (c6) receives a divided block 271. In an example, the classifier 4 (c4), the classifier 5 (c5), and the classifier 6 (c6) may receive the input image based on the second modality and directly divide the received input image.

The classifier 4 (c4) includes a feature extractor 252 and a matcher 253. The feature extractor 252 extracts a feature vector from the block 251. For example, the feature extractor 252 may extract the feature vector from the block 251 based on a fast Fourier transform (FFT). The matcher 253 may match a feature vector extracted by the feature extractor 252 to a feature vector of the enrolled biometric information. For example, the matcher 253 may calculate a score S4 using block matching between the block 251 and the enrolled biometric information. The classifier 5 (c5) and the classifier 6 (c6) may calculate a score S2 and a score S3 based on a similar method used by the classifier 4 (c4).

In another example, the classifier 4 (c4), the classifier 5 (c5), and the classifier 6 (c6) may include a matching device, instead of the feature extractors 252, 262, and 272. The matching device may perform image registration on blocks and the enrolled biometric information. For example, the matching device may determine a transitional and rotational relationship between the blocks and the enrolled biometric information. In this example, the matcher 253, 263, and 273 may calculate a similarity of the blocks and the enrolled biometric information based on a result of the image registration.

The fusion apparatus may determine a fusion parameter for fusing the candidate classifiers 200 by iteratively selecting any one of the candidate classifiers 200. The fusion parameter may include weights of the candidate classifiers 200. An operation of iteratively selecting any one of the candidate classifiers 200 will be described with reference to FIG. 4.

In an example, a heterogeneous biometric recognizer is separated into a plurality of candidate classifiers thereby maximizing fusion performance. For example, a fingerprint recognizer and a face recognizer may be separated into a plurality candidate classifiers for each area or feature.

In the candidate classifiers 200, the six scores s1, s2, s3, s4, s5, and s6 are obtained. When the six scores s1, s2, s3, s4, s5, and s6 are assumed to be results of an independent classifier and perform gentle-boost, n weak classifiers may be obtained.

The n weak classifiers may be a combination of binary classifiers. For example, a final registration result using the n weak classifiers may be expressed as shown in Equation 1.

$$g(x) = \sum_{i=1}^{n} (a_i(H_i(x) > th_i) + b_i) \quad \text{[Equation 1]}$$

In Equation 1, g(x) denotes a final registration result, $H_i(x)$ denotes a score output by an $i^{th}$ weak classifier, thi denotes a threshold of the ith weak classifier, ai denotes a fusion parameter for the ith weak classifier, and $b_i$ denotes a bias value for the $i^{th}$ weak classifier.

The expression $(H_i(x)>th_i)$ is a term differing based on whether the score $H_i(x)$ is greater than the threshold $th_i$. For example, the term $(H_i(x)>th_i)$ is +1 when the score $H_i(x)$ is greater than the threshold $th_i$, and term $(H_i(x)>th_i)$ is −1 when the score $H_i(x)$ is less than or equal to the threshold $th_i$. The fusion apparatus may perform binary decision based on whether the final registration result g(x) is + or −.

As shown in Equation 1, when the score $H_i(x)$ is less than or equal to the threshold $th_i$, the term $(H_i(x)>th_i)$ is −1, so that the final registration result g(x) may be calculated to be small when compared to the score $H_i(x)$ being greater than the threshold $th_i$. In an example, a combination of a linear classifier obtained as shown in Equation 2 may be used.

$$g(x) = \sum_{i=1}^{n} (a_i(H_i(x) > th_i) + b_i) \quad \text{[Equation 2]}$$
$$\approx \sum_{i=1}^{n} (a_i(H_i(x) - th_i) + b_i)$$
$$= \sum_{i=1}^{n} (a_i H_i(x)) + \sum_{i=1}^{n} (-a_i th_i + b_i)$$
$$= \sum_{i=1}^{n} (a_i H_i(x)) + c \approx \sum_{j=1}^{n} (a_i s_i)$$

In Equation 2 expresses $H_i(x)=s_i$ and $(a_iH_i(x))+c \approx a_i s_i$.

In another example, the final registration result g(x) may be expressed as shown in Equation 3.

$$g(x) = \sum_{i=1}^{n} (a_i(H_i(x) > th_i) + b_i) \quad \text{[Equation 3]}$$
$$\approx \sum_{i=1}^{n} \left( a_i \left( \frac{H_i(x) - th_i}{\sigma_i} \right) + b_i \right)$$
$$= \sum_{i=1}^{n} \left( \frac{a_i}{\sigma_i} H_i(x) + d \right)$$
$$\approx \sum_{i=1}^{n} \left( \frac{a_i}{\sigma_i} s_i \right)$$

In Equation 3, thi denotes an average of scores output by the ith weak classifier. The operand oi denotes a score normalization parameter, and the score normalization parameter may be a standard deviation of the scores output by the ith weak classifier.

In an example, a user may be authenticated based on whether the final registration result g(x) is greater than a pre-selected threshold th. The threshold th may be preselected based on test data. For example, the threshold th may be pre-selected based on an FAR required by an application.

In an example, as described above, the fusion apparatus may divide a recognition area for each modality, select a score suitable for each modality, and perform multi-authentication by applying the selected score to a fusion parameter.

For example, a multi-modal fusion in a learning-based method, such as a neural network and a soft vector machine (SVM), requires a function related to an additional learning model, thereby increasing a complexity. In an example, performance of the fusion apparatus may easily enhance without an additional complex calculation process by a score level fusion.

Figure 3:
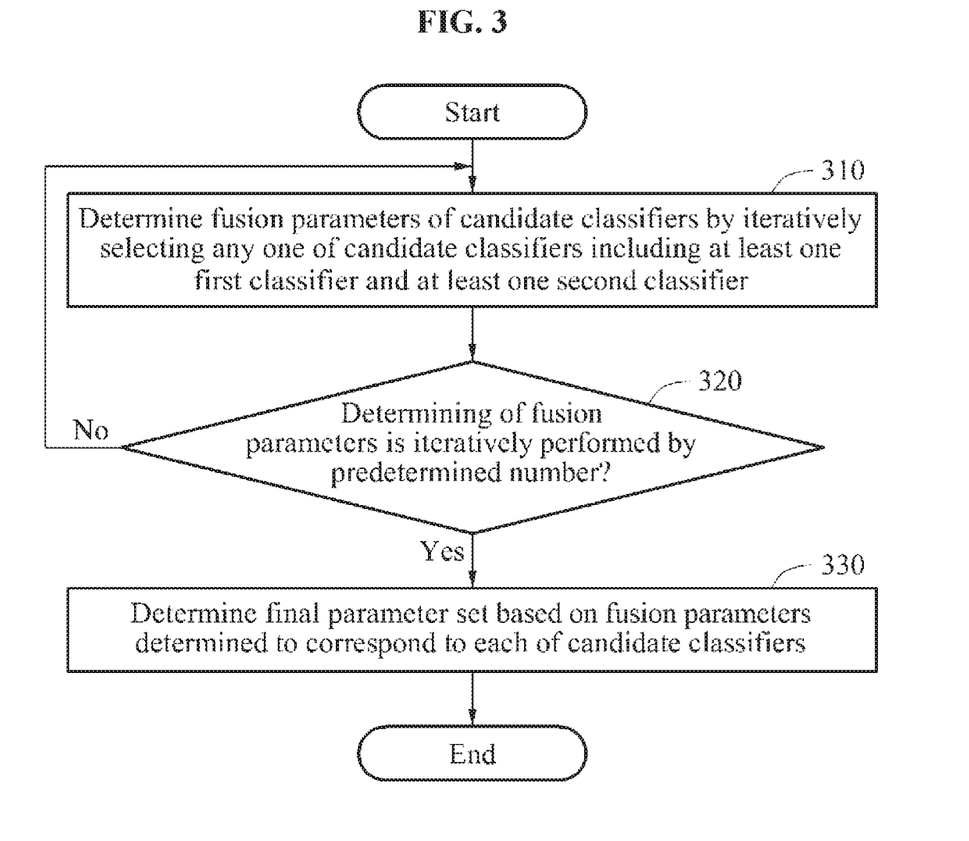
FIG. 3 is a flowchart illustrating a multi-modal fusion method according to at least one example embodiment.

FIG. 3 is a flowchart illustrating a multi-modal fusion method according to at least one example embodiment.

Referring to FIG. 3, in operation 310, a fusion apparatus determines fusion parameters of candidate classifiers by iteratively selecting any one of the candidate classifiers including at least one first classifier and at least one second classifier. The fusion parameters include weights of the candidate classifiers.

In operation 320, the fusion apparatus verifies that operation 310 of determining the fusion parameters is iteratively performed a predetermined or, alternatively, desired number of times, for example, 20 times. When operation 310 is verified not to be iteratively performed the predetermined or, alternatively, desired number of times, the fusion apparatus may perform operation 310 again.

In operation 330, when operation 310 is verified to be iteratively performed the predetermined or, alternatively, desired number of times, the fusion apparatus determines a final parameter set based on the fusion parameters determined to correspond to each of the candidate classifiers. For example, the fusion apparatus may calculate a sum of scores determined with respect to an identical classifier and determine a final parameter set by normalizing scores of each classifier. For example, the final parameter set may be in a form of {a1, a2 . . . , an}.

In an example, the fusion apparatus may determine the final parameter set based on whether a recognition rate determined in operation 310 is greater than or equal to a predetermined or, alternatively, desired threshold, other than based on an iteration number of performing operation 310 of determining the fusion parameters. When the recognition rate, for example, a performance index, determined in operation 310 is greater than or equal to the predetermined or, alternatively, desired threshold, the fusion apparatus may determine the final parameter set based on the fusion parameters determined to correspond to each of the candidate classifiers. A reason of verifying whether the determined recognition rate is greater than or equal to the predetermined or, alternatively, desired threshold is for determining the final parameter set and completing learning of the fusion parameters for fusing the candidate classifiers.

Figure 4:
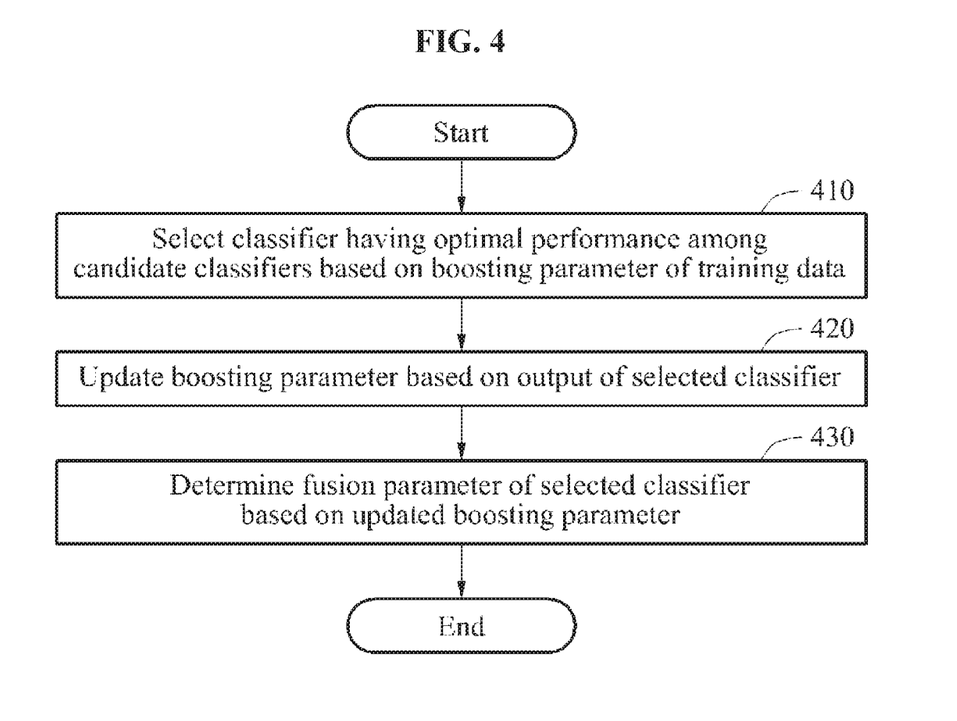
FIG. 4 is a flowchart illustrating a method of determining fusion parameters of candidate classifiers according to at least one example embodiment.

FIG. 4 is a flowchart illustrating a method of determining fusion parameters of candidate classifiers according to at least one example embodiment.

Referring to FIG. 4, in operation 410, a fusion apparatus selects a classifier having an optimal or, alternatively, best performance among candidate classifiers based on a boosting parameter of training data. As used in the present disclosure with reference to a performance or a performance index, the term "best" refers to a highest or most desirable performance or performance index from among a plurality of performances or performance indexes (e.g., a plurality of performances or performance indexes corresponding to a plurality of candidate classifiers, respectively). The boosting parameter may refer to a training weight. For example, the fusion apparatus may select, in a present iteration, a classifier to successfully classify the training data not successfully classified in a previous iteration based on the boosting parameter.

The fusion apparatus selects a classifier having an optimal or, alternatively, best performance index determined based on the boosting parameter and a result of classifying the training data. At least a portion of the candidate classifiers may be selected for a plurality of times. Alternatively, the at least a portion of the candidate classifiers may not be selected.

In operation 420, the fusion apparatus updates the boosting parameter based on an output of the classifier selected in operation 410. The boosting parameter may be determined in a previous iteration. For example, the fusion apparatus may update the boosting parameter by decreasing a value of the boosting parameter of the training data of which a recognition result of the selected classifier is true and/or increasing the value of the boosting parameter of the training data of which the recognition result of the selected classifier is false. In operation 430, the fusion apparatus determines a fusion parameter of the selected classifier based on the boosting parameter updated in operation 420.

In an example, the fusion parameters of the candidate classifiers may be determined by allowing classifiers to be learned based on boosting. The boosting refers to a method of iterating an operation of creating a new classification rule by concentrating on objects improperly classified. The boosting may create a strong prediction model by combining weak prediction models.

The boosting may sequentially generate predictor variables. The boosting may firstly start at an identical weight with respect to row training data. However, based on an iteration of trainings, the boosting may allow improperly classified objects to be properly classified, by assigning, in each of the trainings, a high weight to the training data, for example, training data of which a recognition result is false, that are falsely classified by a classifier, and assigning a low weight to the training data, for example, training data of which the recognition result is true, that are properly classified by the classifier.

For example, 10 items of first training data t_face 1, t_face 2, . . . , t_face 10 including a face image and 10 items of second training data t_fingerprint 1, t_fingerprint 2, . . . , t_fingerprint 10 including a fingerprint image are assumed to be present.

The fusion apparatus may allow the fusion parameters for fusing the candidate classifiers based on the training data.

In more detail, the fusion apparatus may iteratively select any one of the candidate classifiers based on 10 items of the first training data and 10 items of the second training data. The fusion apparatus may select a classifier having an optimal or, alternatively, best performance among the candidate classifiers based on the boosting parameter of the training data.

The fusion apparatus may classify first training data using a classifier 1(c1), a classifier 2(c2), and a classifier 3(c3) and then obtain a performance index based on the boosting parameter to correspond to each of the classifiers 1(c1), 2(c2), and 3(c3). Also, the fusion apparatus may classify second training data using a classifier 4(c4), a classifier 5(c5), and a classifier 6(c6) and then obtain a performance index based on the boosting parameter to correspond to each of the classifiers 4(c4), 5(c5), and 6(c6).

In this example, the performance index based on the boosting parameter may be determined based on whether a result of classifying predetermined or, alternatively, desired training data is true or false and a boosting parameter of the predetermined or, alternatively, desired training data. In an example, the greater a value of the boosting parameter of the training data of which the result of classifying is true, the greater a value of the performance index based on the boosting parameter.

Hereinafter, the method of determining fusion parameters using classifiers, for example, the classifier 1(c1), the classifier 2(c2), and the classifier 3(c3), for face recognition is described as an example. However, classifiers, for example, the classifier 4(c4), the classifier 5(c5), and the classifier 6(c6), for fingerprint recognition, may be also used to determine the fusion parameters based on the aforementioned method.

The fusion apparatus may select a classifier having a highest performance index among the classifiers, for example, the classifier 1(c1), the classifier 2(c2), and the classifier 3(c3), for face recognition. For example, the classifier 2(c2) is assumed to have the highest performance index. In this example, the selected classifier 2(c2) is assumed to recognize that seven, items of training data t_face 1, t_face 3, t_face 4, t_face 5, t_face 7, t_face 9, t_face 10 are true, and three items of training data t_face 2, t_face 6, t_face 8 are false, among 10 items of the first training data t_face 1, t_face 2, . . . , t_face 10 including the face image.

In an initial iteration, the first training data and the second training data may be set to have an identical boosting parameter. Subsequent to selecting a classifier in each iteration, the fusion parameter may maintain or decrease a value of the boosting parameter of the training data of which the recognition result of the classifier 2(c2) is true. For example, when an initial value of the boosting parameter of the training data t_face 1, t_face 3, t_face 4, t_face 5, t_face 7, t_face 9, and t_face 10 of which the recognition result is true is "0.2", the fusion apparatus may decrease the boosting parameter of the training data t_face 1, t_face 3, t_face 4, t_face 5, t_face 7, t_face 9, and t_face 10 to be "0.1." In an example, the fusion parameter may maintain a value of the boosting parameter of the draining data t_face 1, t_face 3, t_face 4, t_face 5, t_face 7, t_face 9, and t_face 10, as "0.2".

The fusion apparatus may increase the value of the boosting parameter of the training data t_face 2, t_face 6, and t_face 8 of which the recognition result of the classifier 2(c2) is false. When an initial value of the boosting parameter of the training data t_face 2, t_face 6, and t_face 8 of which the recognition result of the classifier 2(c2) is false is "0.2", the fusion apparatus may increase the value of the boosting parameter of the training data t_face 2, t_face 6, and t_face 8 by "0.3" to be updated to be "0.5." Accordingly, in a subsequent iteration, the fusion apparatus may select a classifier to more properly classify the training data of which the recognition result by a classifier selected in a present iteration is false. The fusion apparatus may determine a fusion parameter of the classifier 2(c2) based on the boosting parameter updated to be "0.1" or "0.5" in the present iteration.

Based on the boosting parameter updated in the present iteration, the fusion apparatus may select any one of the classifiers, for example, the classifier 1(c1), the classifier 2(c2), and the classifier 3(c3), for the face recognition in the subsequent iteration, and iterate the determining of the fusion parameter of the selected classifier. For example, the fusion apparatus may select a classifier, for example, the classifier 1(c1), having an optimal or, alternatively, best performance among the candidate classifiers based on a value, for example, "0.1" or "0.5", of the boosting parameter of the previously updated training data. The fusion apparatus may re-update the boosting parameter updated to be "0.1" or "0.5" based on an output of the selected classifier, for example, the classifier 1(c1). Therefore, a boosting parameter updated in an n-1th iteration may be used in an nth iteration.

As described above, the fusion apparatus may iteratively perform the determining of the fusion parameter a predetermined or, alternatively, desired number of times and iteratively perform the aforementioned process until a recognition rate determined in the determining of the fusion parameter is to be greater than or equal to a predetermined or, alternatively, desired threshold.

Figure 5A:
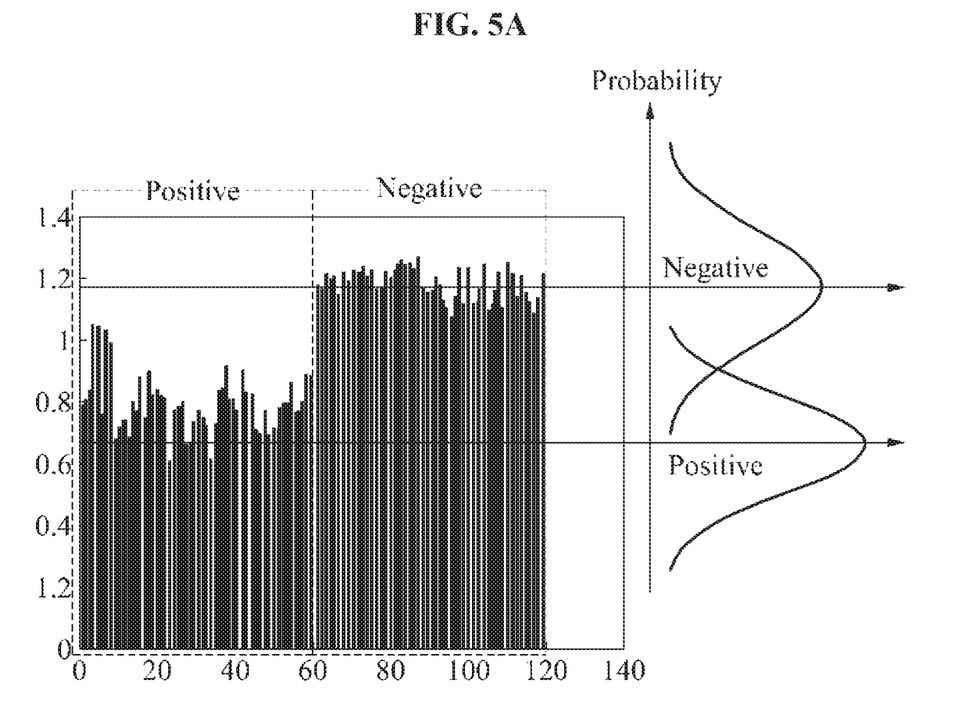
FIGS. 5A and 5B are graphs illustrating examples of distributions of output scores of classifiers based on a first modality and a second modality according to at least one example embodiment.
Figure 5B:
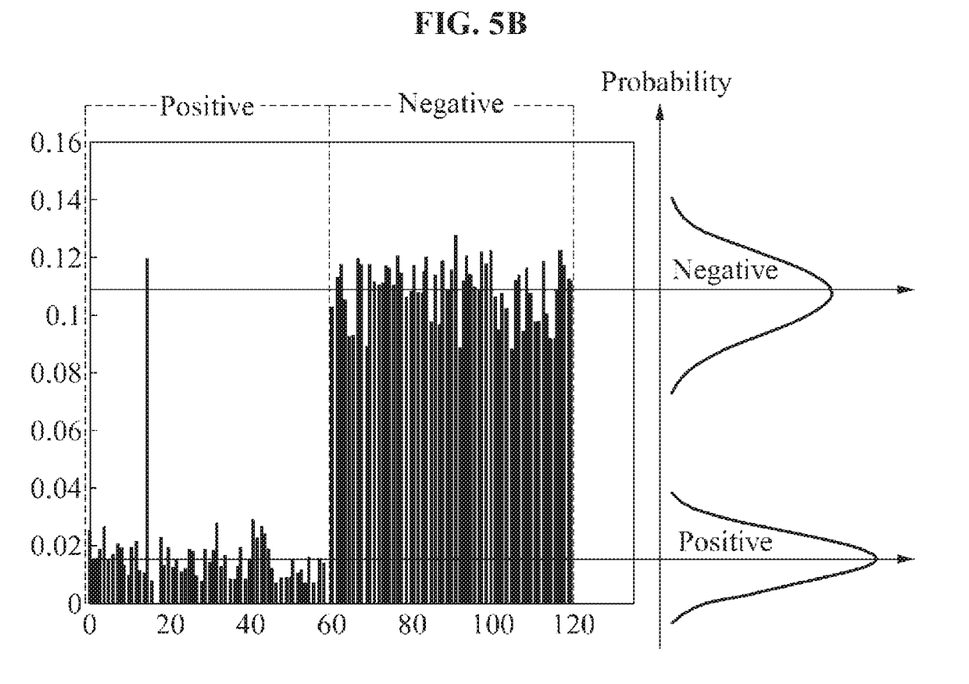

FIGS. 5A and 5B are graphs illustrating examples of distributions of output scores of classifiers based on a first modality and a second modality according to at least one example embodiment.

FIG. 5A illustrates a distribution of an output score of a classifier for face recognition, and FIG. 5B illustrates a distribution of an output score of a classifier for fingerprint recognition. In graphs of FIGS. 5A and 5B, an X-axis indicates an index of a sample, for example, training data, and a Y-axis indicates a Euclidean distance between the sample and an enrolled image. The Euclidean distance indicates that a similarity is high when the Euclidean distance is closer to be "0".

In the graphs of FIGS. 5A and 5B, a number of the positive samples for the face recognition is "60", and a number of negative samples is also "60". However, the number 60 is only an example and other numbers of positive and/or negative samples can be used. In this example, the positive samples refer to samples corresponding to an enrolled user, and the negative samples refer to samples not corresponding to the enrolled user.

In the graph of FIG. 5A, scores with respect to the positive samples are distributed in a vicinity of a point at which the Euclidean distance is "0.65" and scores with respect to the negative samples are distributed in a vicinity of a point at which the Euclidean distance is "1.2". However, outliers are widely distributed outside of a corresponding point. Therefore, a reference of authenticating a user based on the face recognition may be ambiguous.

Since score values of the positive samples and the negative samples are not clearly classified, a great number of overlapped areas are shown in the distribution. Therefore, a recognition result may be greatly changed based on a threshold. In addition, when an FAR increases, a verification rate (VR) may increase.

In the graph of FIG. 5B, the scores with respect to the positive samples are distributed at a vicinity of a point at which the Euclidean distance is "0.02", and the scores with respect to the negative samples are distributed in a vicinity of a point at which the Euclidean distance is approximately "0.11". In a case of fingerprint recognition, since the score values of the positive samples and the negative samples are clearly classified, the distribution may be also clearly represented.

The aforementioned features indicate that the positive samples are clearly recognized to be true, however, the positive samples are falsely recognized to be completely false when a portion of information associated with the positive samples is deformed or disappears. Since a method of correcting samples classified to be true or false by a classifier does not exist, the VR may not be greatly improved even at a high FAR.

When the scores are simply summed in lieu of considering a feature of each modality, an accurate recognition result may not be obtained. In an example, a multi-authentication may be performed by multi-modal fusion based on a feature of each heterogeneous modality.

In an example, it is possible to perform multi-modal fusion by a classification based on a gentle-boost scheme, simplify expressions by approximating a boost result other than using a general gentle-boost scheme, and perform weighted summing of a weight and a score of a classifier selected through learning. The fusion apparatus may enhance performance in speed and volume of memory in lieu of requiring an additional learning model.

In an example, it is possible to perform the multi-modal fusion by the fusion apparatus including a plurality of classifiers for face recognition and a plurality of classifiers for fingerprint recognition. The fusion apparatus may select an optimal or, alternatively, best classifier for the multi-authentication among the plurality of classifiers and obtain an optimal or, alternatively, desirable weight of the optical classifiers based on the gentle-boost scheme.

Figure 6A:
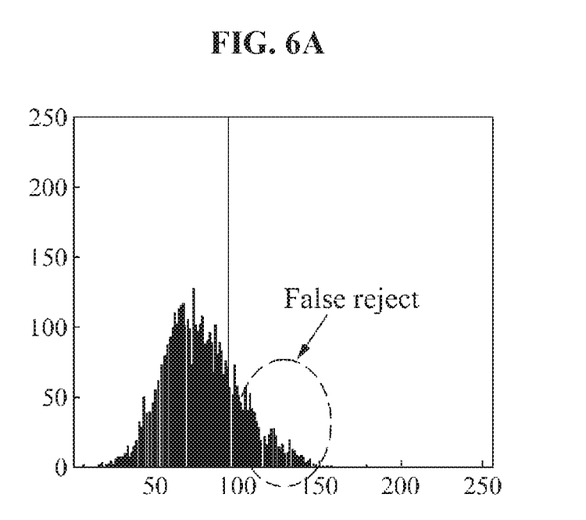
FIGS. 6A through 6C are graphs illustrating examples of a histogram distribution of a homogeneous modality according to at least one example embodiment.
Figure 6B:
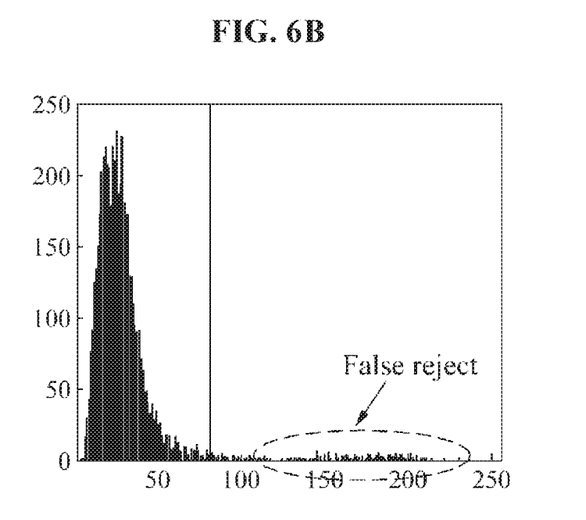
Figure 6C:
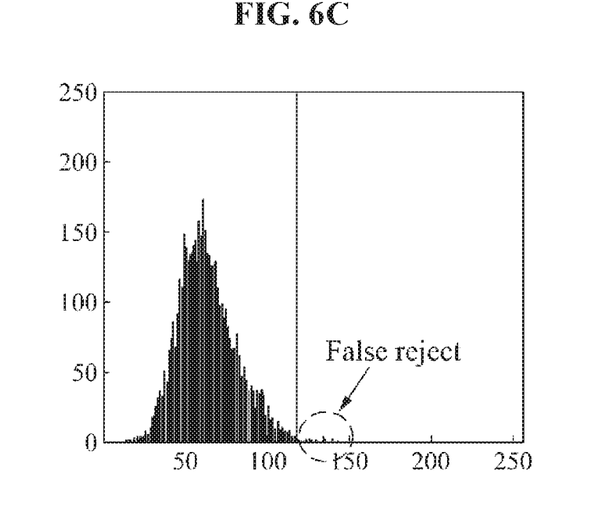

FIGS. 6A through 6C are graphs illustrating examples of a histogram distribution of a homogeneous modality according to at least one example embodiment.

FIGS. 6A through 6C illustrates examples of a histogram distribution quantizing scores of positive samples in each face recognition, for example, a first modality, fingerprint recognition, for example, a second modality, and multi-modal fusion, for example, fusion of the face recognition and the fingerprint recognition. An X-axis indicates an index of a bin and a Y-axis indicates a number of the positive samples included in each bin.

FIG. 6A is a histogram corresponding to a score of positive samples with respect to face recognition, FIG. 6B is a histogram corresponding to a score of positive samples with respect to fingerprint recognition, and FIG. 6C is a histogram corresponding to a score of positive samples in multi-modal fusion.

Referring to FIG. 6A, in a case of the face recognition, a histogram variance corresponding to the score of the positive samples has a width such that a false reject rate (FRR) increases based on a change in a threshold. However, in a case of the face recognition, the positive samples outside of a standard distribution merely exist.

Referring to FIG. 6B, in a case of fingerprint recognition, the histogram variance corresponding to the score of the positive samples is narrow such that the FRR based the change in the threshold is relatively robust when compared to the face recognition. However, in the fingerprint recognition, a large number of the positive samples may exist outside of the standard distribution, and the FRR may increase by the positive samples deviated from the standard distribution.

In an example, it is possible to fuse heterogeneous modalities, for example, face recognition and fingerprint recognition, based on features of each modality in FIGS. 6A and 6B. FIG. 6C illustrates the histogram corresponding to the score of the positive samples with respect to the multi-modal fusion performing fusion on the heterogeneous modalities.

Referring to FIG. 6C, when the heterogeneous modalities are fusioned or fused, the variance of the histogram has a distribution in a middle of the distributions in FIGS. 6A and 6B, and the positive samples outside of the standard distribution merely exist. Therefore, performance of the FRR may greatly enhance.

Figure 7:
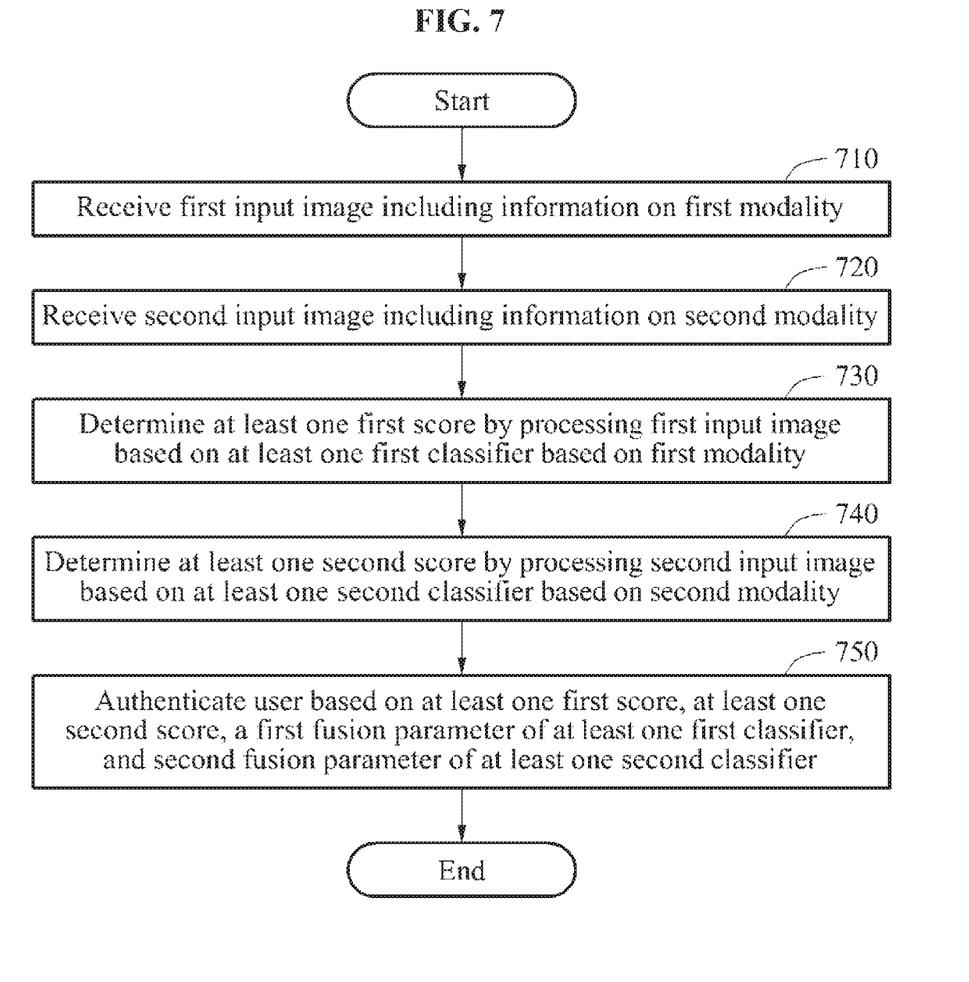
FIG. 7 is a flowchart illustrating a user authentication method based on a multi-modal fusion method according to at least one example embodiment.

FIG. 7 is a flowchart illustrating a user authentication method based on a multi-modal fusion method according to at least one example embodiment.

Referring to FIG. 7, an authentication apparatus may authenticate a user using the fusion parameters determined by the fusion apparatus described with reference to FIGS. 1 through 6. The authentication apparatus may be provided in a software module, a hardware module, or various combinations thereof. For example, the fusion apparatus may be may be implemented based on various methods such as a single processor-based system, a special purpose hardware-based system, a system in which a processor and an HWA are combined, and a cloud computing system. The fusion apparatus may include a user terminal, for example, a smartphone.

In operation 710, the authentication apparatus receives a first input image including information on a first modality. In operation 720, the authentication apparatus receives a second input image including information on a second modality. For example, the first modality may be a face of a user and the second modality may be a fingerprint of the user. In this example, the first input image may be a face image and the second input image may be a fingerprint image. The fingerprint image may be a portion image including information on a portion of an entire fingerprint of the user.

In operation 730, the authentication apparatus determines at least one first score by processing the first input image based on at least one first classifier based on the first modality. In operation 740, the authentication apparatus determines at least one second score by processing the second input image based on at least one second classifier based on the second modality.

The authentication apparatus may divide the first input image and the second input image into a plurality of sub-blocks. The plurality of sub-blocks may correspond to an area or a portion of the first input image and the second input image.

For example, when the first input image is the face image, the authentication apparatus may extract a plurality of subareas from the face image. The plurality of subareas may be determined in advance as a contour of a face, an eye, and a nose. When the second input image is the fingerprint image, the authentication apparatus may divide the fingerprint image into a plurality of blocks. The plurality of blocks may have predetermined or, alternatively, desired sizes and predetermined or, alternatively, desired shapes.

The authentication apparatus may determine a score of the sub-blocks divided using a corresponding classifier. For example, when the first input image is the face image, the at least one first classifier may be determined to correspond to a plurality of predetermined or, alternatively, desired subareas among the face image. In this example, the at least one first classifier includes classifiers corresponding to the plurality of subareas, for example, a contour of a face, an eye, and a nose.

When the second input image is the fingerprint image, at least one second classifier may correspond to at least a portion of the plurality of blocks. For example, the at least one second classifier may be determined based on a result of arranging matching scores between enrolled images and blocks to divide the fingerprint image. The at least one second classifier may correspond to a predetermined or, alternatively, desired number of pairs of the enrolled images and the blocks having high matching scores between the enrolled images and the blocks. The authentication apparatus may calculate the matching scores between a plurality of enrolled images and a plurality of blocks and select a predetermined or, alternatively, desired number of best scores. Each of the plurality of enrolled images may be portion images including information on a portion of a fingerprint of a pre-enrolled user. In this example, the at least one second classifier may refer to classifiers determining the selected best scores.

In an example, the at least second classifier may be provided in a single module. In this example, the single module may sequentially determine the matching scores between the plurality of enrolled images and the plurality of blocks. For example, the single module may sequentially determine matching scores between the plurality of enrolled images and a first block, and sequentially determine matching scores between the plurality of enrolled images and a second block. The single module may determine the matching scores between the plurality of enrolled images and each of the blocks based on the aforementioned method.

In operation 750, the authentication apparatus authenticates a user based on the at least one first score, the at least one second score, a first fusion parameter of the at least one first classifier, and a second fusion parameter of the at least one second classifier.

The first fusion parameter and the second fusion parameter may correspond to values determined based on features of each modality. For example, when the first input image is a face image, a position of a subarea in the face corresponding to the first input image is significant. Accordingly, the first fusion parameter may reflect a first priority based on the position of subarea in the face. In addition, when the second input image is a portion fingerprint image, a position of the portion fingerprint image in an entire fingerprint or a position of a block in the portion fingerprint image are not significant. Accordingly, the second fusion parameter may less reflect, compared to the first priority, or not reflect a second priority based on the position of the portion fingerprint image in the entire fingerprint or the position of the block in the portion fingerprint image.

In this example, the first fusion parameter and the second fusion parameter may be determined based on a boosting scheme in a learning stage. For example, the first fusion parameter and the second fusion parameter may be determined by selecting any one of at least one first classifier and at least one second classifier in each iteration of the boosting scheme.

For example, at least one of the first fusion parameter and the second fusion parameter may be determined based on the following process. The authentication apparatus selects a classifier having an optimal or, alternatively, best performance among candidate classifiers based on a boosting parameter of training data and updates the boosting parameter based on an output of the selected classifier. The authentication apparatus may determine at least one of the first fusion parameter and the second fusion parameter by determining a fusion parameter of the selected classifier based on the updated boosting parameter.

Repeated descriptions will be omitted for increased clarity and conciseness because the descriptions provided with reference to FIGS. 1 through 6 are also applicable to FIG. 7.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A user authentication method comprising:
   receiving a first input image including information on a first modality;
   receiving a second input image including information on a second modality;
   determining at least one first score by processing the first input image based on at least one first classifier, the at least one first classifier being based on the first modality;
   dividing the second input image into a plurality of blocks which correspond, respectively, to a plurality of second classifiers;
   determining best scores from among matching scores between enrolled images and the plurality of blocks;
   determining at least one second score by processing the second input image based on at least one second classifier from among the plurality of second classifiers, the plurality of second classifiers being based on the second modality, wherein the at least one second classifier is determined based on the determined best scores; and
   authenticating a user based on the at least one first score, the at least one second score, a first fusion parameter of the at least one first classifier, and a second fusion parameter of the at least one second classifier.

2. The method of claim 1, wherein the determining of the at least one first score comprises:
   extracting a subarea from the first input image; and
   determining a score of the subarea using a classifier corresponding to the extracted subarea among the at least one first classifier.

3. The method of claim 1 wherein,
   the first modality is a modality of a first type and the second modality is a modality of a second type,
   the first type and the second type are each at least one of a face of the user, a fingerprint of the user, an iris of the user, or a vein of the user, and
   the first type differs from the second type.

4. The method of claim 1, wherein the first fusion parameter and the second fusion parameter are determined in advance based on a boosting scheme.

5. The method of claim 4, further comprising:
   executing the boosting scheme such that the boosting scheme includes,
      selecting a classifier having an optimal performance among candidate classifiers based on a boosting parameter of training data, updating the boosting parameter based on an output of the selected classifier, and determining at least one of the first fusion parameter and the second fusion parameter by determining a fusion parameter of the selected classifier based on the updated boosting parameter.

6. The method of claim 1, wherein the authenticating of the user comprises:

performing weighted summing of the first score and the second score based on the first fusion parameter and the second fusion parameter; and authenticating the user by performing a comparison operation based on a result of the weighted summing and a first threshold.

7. The method of claim 1, further comprising:

determining the at least one first classifier to correspond to at least one subarea in the first input image.

8. The user authentication method of claim 1, wherein the best scores are the highest scores from among the matching scores, and a total number of the best scores is less than a total number of the matching scores.

9. A non-transitory computer-readable medium storing program code including instructions that, when executed by one or more processors, cause the one or more processors to perform the method of claim 1.

10. A multi-modal fusion method comprising:

determining fusion parameters of candidate classifiers by iteratively selecting classifiers from among candidate classifiers over a plurality of iterations such that the iterative selecting includes, selecting, during a first iteration of the plurality of iterations, a classifier having a best performance among the candidate classifiers based on a boosting parameter of training data, updating the boosting parameter based on an output of the selected classifier, and determining a fusion parameter of the selected classifier based on the updated boosting parameter, the determined fusion parameter being a weight value corresponding to the selected classifier, the candidate classifiers including, at least one first classifier configured to authenticate a user based on a first modality, and at least one second classifier configured to authenticate the user based on a second modality, wherein the at least one second classifier is based on a result of arranging matching scores between enrolled biometric information and blocks to divide input biometric information.

11. The method of claim 10, wherein the boosting parameter is determined during a second iteration from among the plurality of iterations, the second iteration occurring before the first iteration.

12. The method of claim 10, wherein the selecting of the classifier comprises:

selecting a classifier having an best performance index determined based on the boosting parameter and a result of classifying the training data.

13. The method of claim 10, wherein the updating of the boosting parameter comprises:

decreasing a value of the boosting parameter of data from among the training data that was properly classified by the selected classifier; and increasing the value of the boosting parameter of data from among the training data that was improperly classified by the selected classifier.

14. The method of claim 10, further comprising:

determining a final parameter set based on the fusion parameters when the determining of the fusion parameters is iteratively performed a first number or times.

15. The method of claim 10, further comprising:

determining a final parameter set based on the fusion parameters when a recognition rate determined in the determining of the fusion parameters is greater than or equal to a first threshold.

16. The method of claim 10 wherein, the first modality is a modality of a first type and the second modality is a modality of a second type, the first type and the second type are each at least one of a face of the user, a fingerprint of the user, an iris of the user, and a vein of the user, and the first type differs from the second type.

17. The method of claim 10, further comprising:

determining the at least one first classifier to correspond to at least one subarea in an input image.

* * * * *